United States Patent
Rajagopalan et al.

(10) Patent No.: US 10,405,401 B2
(45) Date of Patent: Sep. 3, 2019

(54) PRECIPITATION SENSING LUMINAIRE

(71) Applicant: SIGNIFY HOLDING B.V., Eindhoven (NL)

(72) Inventors: Ruben Rajagopalan, Neuss (DE); Harry Broers, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/563,883

(22) PCT Filed: Apr. 1, 2016

(86) PCT No.: PCT/EP2016/057195
§ 371 (c)(1),
(2) Date: Oct. 2, 2017

(87) PCT Pub. No.: WO2016/156563
PCT Pub. Date: Oct. 6, 2016

(65) Prior Publication Data
US 2018/0124900 A1    May 3, 2018

(30) Foreign Application Priority Data
Apr. 1, 2015 (EP) .................................. 15162140

(51) Int. Cl.
*H05B 37/02*    (2006.01)
*G01W 1/14*    (2006.01)
(Continued)

(52) U.S. Cl.
CPC .......... *H05B 37/0227* (2013.01); *G01W 1/14* (2013.01); *F21S 8/086* (2013.01); *F21W 2131/103* (2013.01)

(58) Field of Classification Search
CPC .... F21S 8/086; F21W 2131/103; G01W 1/14; H05B 37/0227
See application file for complete search history.

(56) References Cited

U.S. PATENT DOCUMENTS 3,141,330 A * 7/1964 Murray .................... G01W 1/14
356/72
4,613,938 A * 9/1986 Hansen .............. G01N 15/0227
250/574
(Continued)

FOREIGN PATENT DOCUMENTS

EP    0422553 A1    4/1991
EP    2533074 A2    12/2012
(Continued)

*Primary Examiner* — Alexander H Taningco
*Assistant Examiner* — Kurtis R Bahr
(74) *Attorney, Agent, or Firm* — Meenakshy Chakravorty

(57) ABSTRACT

A luminaire comprising: at least one light source arranged to emit light to illuminate an outdoor environment of the luminaire; at least one sensor, each of the at least one sensor arranged to provide a sensor output signal; a control module arranged to receive the sensor output signal from each of the at least one sensor and configured to communicate with a component of the luminaire based on the at least one sensor output signal; and a precipitation detection module arranged to receive the at least one sensor output signal and configured to detect occurrence of precipitation in the outdoor environment based on the at least one sensor output signal and control the light emitted from the at least one light source based on said detection.

19 Claims, 4 Drawing Sheets

(51) Int. Cl.
*F21S 8/08* (2006.01)
*F21W 131/103* (2006.01)

(56) References Cited

U.S. PATENT DOCUMENTS

| | | | | |
|---|---|---|---|---|
| 5,528,224 | A * | 6/1996 | Wang | G01W 1/14 |
| | | | | 250/573 |
| 9,465,987 | B1 * | 10/2016 | Bell | G06K 9/00798 |
| 2002/0080618 | A1 * | 6/2002 | Kobayashi | B60Q 1/085 |
| | | | | 362/466 |
| 2013/0231866 | A1 | 9/2013 | Wang et al. | |
| 2013/0253713 | A1 | 9/2013 | Van Wagoner et al. | |
| 2014/0239808 | A1 * | 8/2014 | Nava | H05B 37/0218 |
| | | | | 315/82 |
| 2015/0123817 | A1 * | 5/2015 | Almalki | F03D 9/00 |
| | | | | 340/907 |
| 2016/0189540 | A1 * | 6/2016 | Fowe | G08G 1/096775 |
| | | | | 701/70 |
| 2016/0338175 | A1 * | 11/2016 | Broers | G06K 9/2027 |

FOREIGN PATENT DOCUMENTS

| | | | |
|---|---|---|---|
| GB | 2412735 | A | 10/2005 |
| GB | 2489394 | A | 3/2012 |
| WO | 2009003473 | A1 | 1/2009 |
| WO | 2012159633 | A1 | 11/2012 |
| WO | 2013147605 | A2 | 10/2013 |

\* cited by examiner

PRECIPITATION SENSING LUMINAIRE

CROSS-REFERENCE TO PRIOR APPLICATIONS

This application is the U.S. National Phase application under 35 U.S.C. § 371 of International Application No. PCT/EP2016/057195, filed on Apr. 1, 2016, which claims the benefit of European Patent Application No. 15162140.6, filed on Apr. 1, 2015. These applications are hereby incorporated by reference herein.

TECHNICAL FIELD

The present disclosure relates to precipitation sensing. In particular, the present disclosure relates to precipitation sensing implemented by an outdoor luminaire.

BACKGROUND

There is an increasing need for sensor-driven lighting control systems having integrated sensors (presence, motion, motion-object-type, etc.) in lighting installations for smart light control, because of their advantage of bringing down the energy consumption of the light source(s) thereof, and thereby improving cost-savings, and life-time of the light source(s).

A range of sensing functionalities are being integrated in light poles, ranging from presence sensing (for light-control), orientation sensing (luminaire diagnostics) to environmental monitoring. Presence sensing allows light source(s) of a lighting system to be switched off or dimmed down when no persons or objects are present in a space, and conversely to be switched on or dimmed up when a person or an object is present in the space, to reduce the energy consumption of the lighting system. Orientation sensing allows sub-optimal orientation of a sensor to be detected which can be caused by poor installation of the sensor by a novice installer, and/or sometimes even after installation of the sensor due to a drift in its orientation due to mechanical or environmental effects, to be corrected and/or taking into account when controlling the light source(s).

The light source(s) are typically Light-Emitting Diodes (LEDs) due to the fact that LEDs consume less electrical energy than many conventional light sources such as conventional incandescent lamps, fluorescent lamps, neon tubes etc. and have much longer lifetimes. LEDs are vulnerable to damage if exposed to high temperatures and/or high humidity. Environmental monitoring enables environmental conditions such temperature and humidity to be monitored and used to avoid malfunction of the LEDSs i.e. turn off the LEDs or activate a cooling device such as a fan. Furthermore controlling the hue of the light emitted by the light source(s) is sometimes desirable as the environment changes, for instance when fog comes in etc.

Various precipitation sensing techniques are known, including a tipping-bucket rain gauge, an optical (infra-red) rain gauge (commonly used in automotive windshields), a capacitive sensor, and an acoustic rain sensor described in UK patent application publication no. GB2412735, whereby a microphone housed entirely within an enclosure is used to detect precipitation landing on an outer surface of the enclosure.

SUMMARY

The inventors have recognised that known precipitation sensing techniques mentioned above require dedicated sensor systems which pose difficulties for integration into intelligent lighting systems due to financial cost and additional system complexities that are incurred.

The inventors have further recognised that as known precipitation sensing techniques rely on a single modality, the performance in classifying precipitation type (drizzle, rain, snow, sleet, hail etc.) can often be poor.

The present disclosure relates to the reuse of existing sensors like accelerometers, humidity and temperature sensors, and microphones that are typically provided in a luminaire, in order to detect precipitation, thereby eliminating the financial cost and additional system complexities incurred with additional sensor integration. By optimal sensor fusion of the above modalities, the overall detection and classification performance of the system can also be improved.

According to one aspect of the present disclosure there is provided a luminaire comprising: at least one light source arranged to emit light to illuminate an outdoor environment of the luminaire; at least one sensor, each of the at least one sensor arranged to provide a sensor output signal; a control module arranged to receive the sensor output signal from each of the at least one sensor and configured to communicate with a component of the luminaire based on the at least one sensor output signal; and a precipitation detection module arranged to receive the at least one sensor output signal and configured to detect occurrence of precipitation in the outdoor environment based on the at least one sensor output signal and control the light emitted from the at least one light source based on said detection.

The luminaire may further comprise a memory storing reference precipitation information; wherein the precipitation detection module is configured to convert the at least one sensor output signal into a frequency domain waveform and compare the frequency domain waveform to the reference precipitation information to detect the occurrence of precipitation in the outdoor environment.

The memory may store reference precipitation information associated with each of a plurality of precipitation types; wherein the precipitation detection module is configured to: compare the frequency domain waveform to the reference precipitation information to classify the detected precipitation as one of the plurality of precipitation types; and control the light emitted from the at least one light source based on the detected precipitation type.

The memory may store precipitation information associated with each of a plurality of precipitation intensities; wherein the precipitation detection module is configured to: compare the frequency domain waveform to the reference precipitation information to classify the detected precipitation as one of the plurality of precipitation intensities; and control the light emitted from the at least one light source based on the detected precipitation intensity.

The at least one sensor may comprise an accelerometer configured to provide an accelerometer output signal.

The at least one sensor may comprise a microphone configured to provide a microphone output signal.

The at least one sensor may comprises at least one of: a temperature sensor configured to provide a temperature signal indicative of a temperature of the outdoor environment of the luminaire, wherein the precipitation detection module is configured to classify the detected precipitation as one of the plurality of precipitation types based on the temperature signal; and a humidity sensor configured to provide a humidity signal indicative of a humidity level of the outdoor environment of the luminaire, wherein the precipitation detection module is configured to classify the detected precipitation as one of the plurality of precipitation types based on the humidity signal.

The at least one sensor may comprise a temperature sensor arranged to provide a temperature signal indicative of a temperature of the outdoor environment of the luminaire, and the precipitation detection module is configured to detect occurrence of precipitation in the outdoor environment based on the temperature signal.

The precipitation detection module may be further configured to classify the detected precipitation as one of the plurality of precipitation types based on the temperature signal.

The at least one sensor may comprise a humidity sensor configured to provide a humidity signal indicative of a humidity level of the outdoor environment of the luminaire, and the precipitation detection module is configured to detect occurrence of precipitation in the outdoor environment based on the humidity signal.

The precipitation detection module may be further configured to classify the detected precipitation as one of the plurality of precipitation types based on the humidity signal.

The at least one sensor may comprise a pressure sensor configured to provide a pressure signal indicative of atmospheric pressure in the outdoor environment of the luminaire, and the precipitation detection module is configured to detect occurrence of precipitation in the outdoor environment based on the pressure signal.

The luminaire may further comprise a network interface, and the precipitation detection module may be further configured to collect precipitation data based on the at least one sensor output signal and transmit the collected precipitation data to a remote computing device via the network interface.

According to one aspect of the present disclosure there is provided a street light comprising: a pole; and the luminaire according to any of the embodiments described herein, wherein the luminaire is mounted to said pole.

According to one aspect of the present disclosure there is provided a mobile device comprising: output means; at least one sensor, each of the at least one sensor arranged to provide a sensor output signal; a control module arranged to receive the sensor output signal from each of the at least one sensor and configured to communicate with a component of the mobile device based on the at least one sensor output signal; and a precipitation detection module arranged to receive the at least one sensor output signal and configured to detect occurrence of precipitation in the outdoor environment based on the at least one sensor output signal and control the output means to provide an output signal based on said detection.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
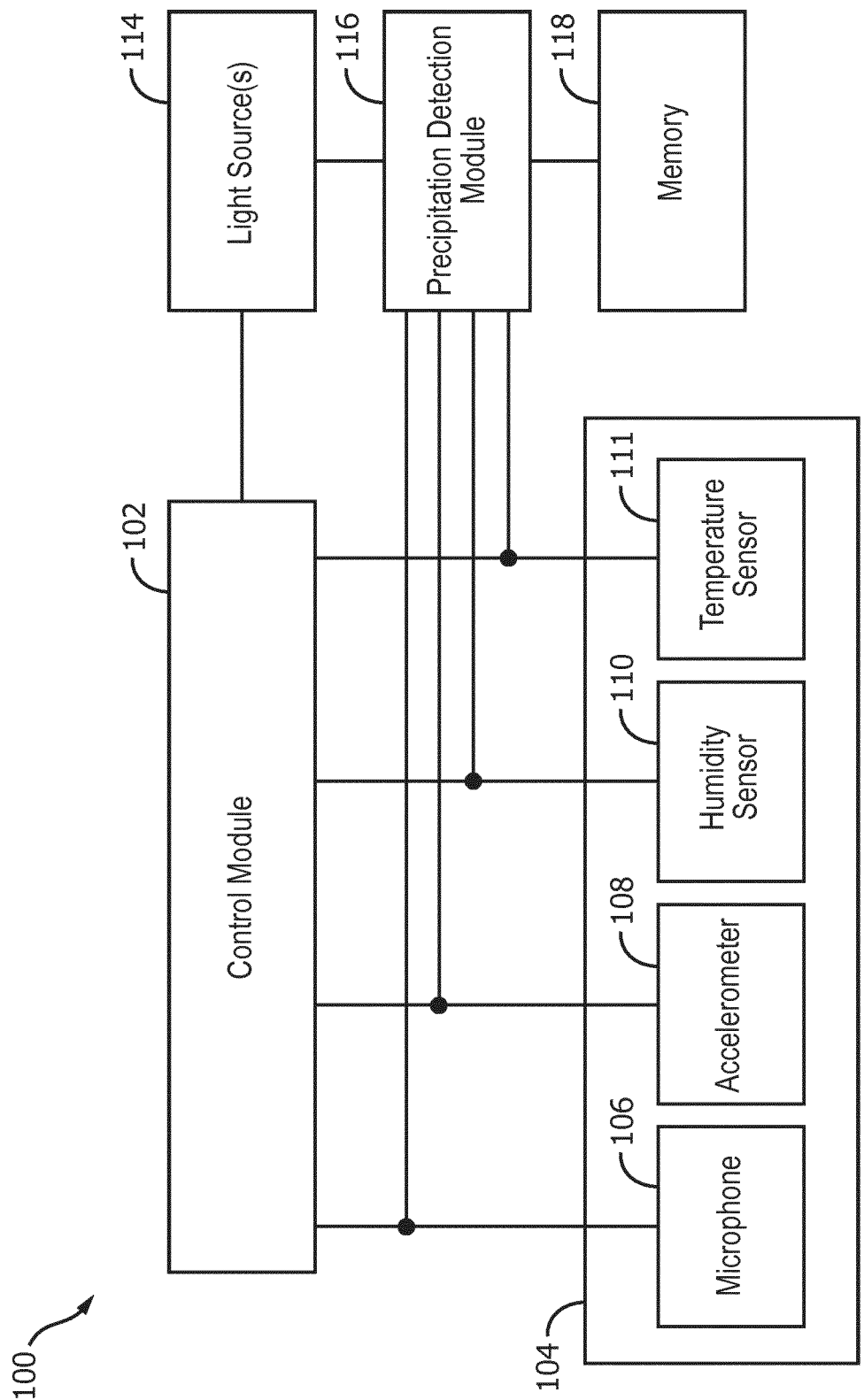
FIG. 1 is a schematic block diagram of a luminaire.

Reference is first made to FIG. 1 which illustrates a schematic block diagram of a luminaire 100. It will be appreciated that the luminaire 100 may comprise other components and connections not shown in FIG. 1.

The luminaire 100 comprises a control module 102 which is coupled to at least one light source 114 and at least one sensor 104. As shown in FIG. 1, the control module 102 is arranged to receive a sensor output signal from each of the sensor(s) 104. The control module 102 is configured to communicate with a component of the luminaire 100 based on the sensor output signals received from the sensor(s) 104.

As shown in FIG. 1, the sensor(s) 104 may comprise a microphone 106 that is configured to provide a microphone output signal to the control module 102. The microphone 106 is arranged to protrude from the housing of the luminaire 100 to enable the microphone 106 to receive audio signals from the outdoor environment of the luminaire 100. In this scenario, the control module 102 may be configured to use the microphone output signal to monitor traffic volume of vehicles passing by in the vicinity of the luminaire 100 by execution of a traffic monitoring algorithm and communicate with a component of the luminaire 100 based on the monitored traffic. For example, the control module 102 may control the light emitted from the light source(s) 114 by transmitting appropriate control signals to the light source(s) 114. Alternatively or additionally the control module 102 may store traffic monitoring data in a data store of the luminaire e.g. in memory 118. Alternatively or additionally the control module 102 may transmit traffic monitoring data via a network interface of the luminaire (not shown in FIG. 1) to a remote computing device. The network interface may enable connection to the remote computing device via a wired communication network or a wireless communication network (e.g. based on a short-range RF technology such as Wi-Fi or ZigBee network or a wide area network or internetwork, such as the Internet or a cellular mobile phone network).

As shown in FIG. 1, the sensor(s) 104 may comprise an accelerometer 108 that is configured to provide an accelerometer output signal to the control module 102.

In this scenario, the control module 102 may be configured to use the accelerometer output signal to detect the orientation of a presence sensor of the luminaire 100, determine whether the orientation of the presence sensor is sub-optimal, and communicate with a component of the luminaire 100 if the orientation of presence sensor is sub-optimal. As used herein, the term "orientation" of the presence sensor refers to the degree of rotation with respect to one or more axes. The accelerometer 108 may provide a single or multi axis measurement(s). That is, the accelerometer 108 may provide a measurement pertaining to the rotation about one or more axes.

The detected orientation may include one or more of a roll angle which indicates the rotation around the longitudinal axis (x-axis), a pitch angle which indicates the rotation around the lateral axis (y-axis), and a yaw angle which indicates the rotation around the vertical axis (z-axis).

The control module 102 is configured to have access to a priori information on the optimal orientation for the presence sensor. For example this a priori information on the optimal orientation for the presence sensor may be stored in memory 118.

The control module 102 is configured to compare the detected orientation of the presence sensor with the a priori information on the optimal orientation for the presence sensor, to determine whether the orientation of the presence sensor is within a predetermined threshold of the optimal orientation of the presence sensor. That is, the control module 102 may determine whether a detected roll angle is within a predetermined roll angle range, and/or whether a detected pitch angle is within a predetermined pitch angle range, and/or whether a detected yaw angle is within a predetermined yaw angle range.

If the control module 102 determines that the detected orientation of the presence sensor is not within the predetermined threshold of the optimal orientation of the luminaire 100, then the control module 102 is configured to determine that the orientation of the presence sensor is sub-optimal and communicate with a component of the luminaire 100.

The control module 102 may control the light emitted from the light source(s) 114 by transmitting appropriate control signals to the light source(s) 114 to visually indicate that the orientation of the presence sensor is sub-optimal. Alternatively or additionally the control module 102 may control one or more speakers of the luminaire 100 (not shown in FIG. 1) to output an audio signal to provide an alert that the orientation of the presence sensor is sub-optimal. Alternatively or additionally the control module 102 may disable control of the light source(s) 114 based on the signal received by a presence/motion sensor (not shown in FIG. 1) to avoid potential for false positives which can occur when the orientation of the presence sensor is sub-optimal. Alternatively or additionally the control module 102 may control operation of sensor circuitry coupled to the presence sensor to correct and compensate for the change in orientation of the presence sensor (e.g. control the voltage gain applied by an amplifier of the sensor circuitry, control the filtering implemented by a filter of the sensor circuitry). Alternatively or additionally the control module 102 may control orientation control means e.g. electro-mechanical motor(s) (not shown in FIG. 1) that is coupled to the presence sensor circuit board by a suitable interface to adjust the orientation of the presence sensor. Alternatively or additionally the control module 102 may store orientation data in a data store of the luminaire e.g. in memory 118. Alternatively or additionally the control module 102 may transmit orientation data via the network interface of the luminaire (referred to above) to a remote computing device.

The change in the orientation (from a desired orientation) of the presence sensor to cause the orientation of the presence sensor to be sub-optimal could be either a fixed orientation offset due to an error by the installer of the luminaire 100, or a dynamic orientation offset due to mechanical/environmental effects (for example due to a lighting pole of a street light swinging under heavy wind conditions).

As shown in FIG. 1, the sensor(s) 104 may comprise a humidity sensor 110 that is configured to provide a humidity signal, indicative of a humidity level of the outdoor environment of the luminaire 100, to the control module 102.

In this scenario, the control module 102 is configured to communicate with a component of the luminaire 100 based on the humidity signal. The control module 102 may control the light emitted from the light source(s) 114 by transmitting appropriate control signals to the light source(s) 114. For example, the control module 102 may control the hue of the light emitted from the light source(s) 114 (e.g. may increase the yellow content to increase visibility) upon detection that the humidity of the outdoor environment of the luminaire 100 has exceeded a predetermined threshold. Alternatively or additionally the control module 102 may store humidity data in a data store of the luminaire e.g. in memory 118. Alternatively or additionally the control module 102 may transmit humidity data via the network interface of the luminaire (referred to above) to a remote computing device (e.g. a remote weather monitoring station).

As shown in FIG. 1, the sensor(s) 104 may comprise a temperature sensor 112 that is configured to provide a temperature signal, indicative of a temperature of the outdoor environment of the luminaire 100, to the control module 102.

In this scenario, the control module 102 is configured to communicate with a component of the luminaire 100 based on the temperature signal. The control module 102 may control the light emitted from the light source(s) 114 by transmitting appropriate control signals to the light source(s) 114. Alternatively or additionally the control module 102 may turn off the light source(s) 114 upon detection that the temperature of the outdoor environment of the luminaire 100 has exceeded a predetermined threshold, to avoid malfunction of the light source(s) 114. Alternatively or additionally the control module 102 may turn on a cooling device such as a fan (not shown in FIG. 1) of the luminaire 100, to avoid malfunction of the light source(s) 114. Alternatively or additionally the control module 102 may store temperature data in a data store of the luminaire e.g. in memory 118. Alternatively or additionally the control module 102 may transmit temperature data via the network interface of the luminaire (referred to above) to a remote computing device (e.g. a remote weather monitoring station).

The functionality of the control module 102 referred to above may be implemented in code (software) stored on a memory comprising one or more storage media (e.g. memory 118), and arranged for execution on a processor comprising on or more processing units. The code is configured so as when fetched from the memory and executed on the processor to perform operations in line with embodiments discussed below. Alternatively it is not excluded that some or all of the functionality of the control module 102 is implemented in dedicated hardware circuitry, or configurable hardware circuitry like a field-programmable gate array (FPGA).

Whilst FIG. 1 shows the sensor(s) 104 comprising a microphone 106, accelerometer 108, humidity sensor 110, and a temperature sensor 112. It will be appreciated that in embodiments of the present disclosure the sensor(s) 104 may comprise one or any combination of these sensors.

In embodiments of the present disclosure, precipitating sensing functionality is provided by way of a precipitation detection module 116 that is arranged to receive a sensor output signal from each of the sensor(s) 104. That is, if the at least one sensor 104 comprises the microphone 106, the precipitation detection module 116 is configured to receive the microphone output signal output by the microphone 106. If the at least one sensor 104 comprises the accelerometer 108, the precipitation detection module 116 is configured to receive the accelerometer output signal output by the accelerometer 108. If the at least one sensor 104 comprises the humidity sensor 110, the precipitation detection module 116 is configured to receive the humidity signal output by the humidity sensor 110. If the at least one sensor 104 comprises the temperature sensor 110, the precipitation detection module 116 is configured to receive the temperature signal output by the temperature sensor 112.

Figure 2A:
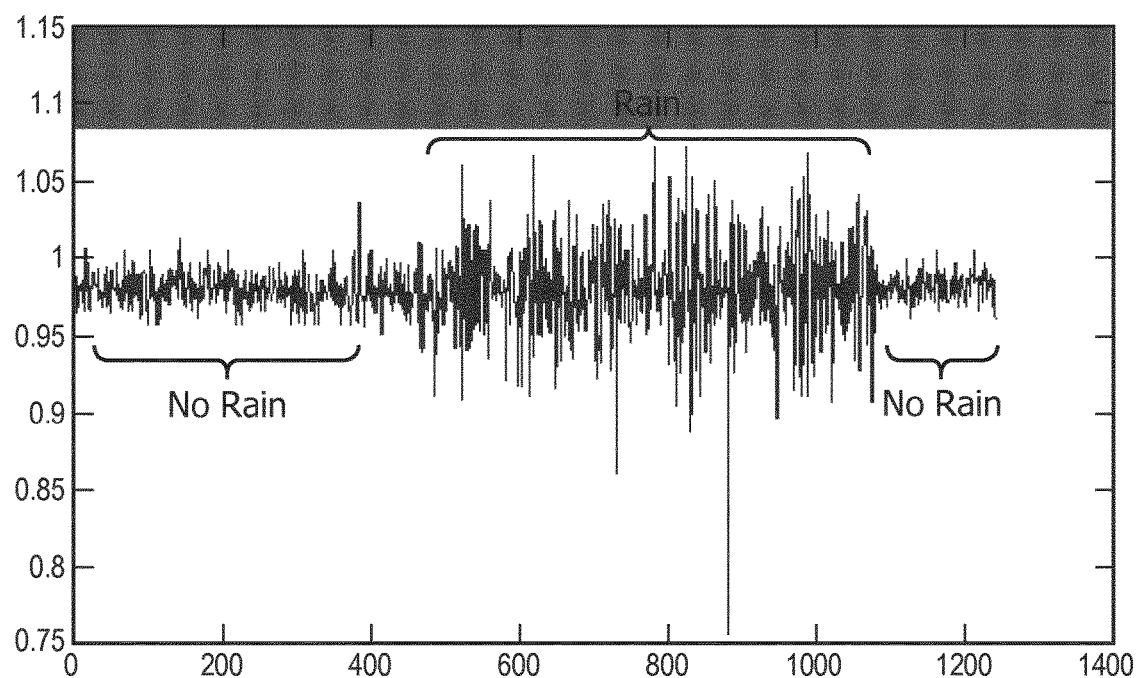
FIG. 2a illustrates a single axis time-domain waveform output by an accelerometer during time intervals of no rain and rain.

Reference is now made to FIG. 2a which illustrates a single axis time-domain waveform output by the accelerometer 108 during time intervals of no rain and rain. As can be seen from FIG. 2a the amplitude of the time domain waveform output by the accelerometer 108 increases during periods of rain. Thus it can be seen that the accelerometer 108 can be used to detect precipitation from the vibration experienced by the accelerometer 108 during periods when precipitation is incident on the housing of the luminaire 100 or the accelerometer 108 itself (depending on how the accelerometer 108 is mounted within the luminaire 100).

In order to detect the occurrence of precipitation in the outdoor environment of the luminaire 100, the precipitation detection module 116 may be configured to convert the accelerometer output signal into a frequency domain waveform by execution of a Fast Fourier Transform algorithm. Once the frequency domain representation of the accelerometer output signal is obtained, the precipitation detection module 116 is configured to compare the frequency domain waveform to reference precipitation information stored in memory 118 to detect the occurrence of precipitation in the outdoor environment of the luminaire 100. The reference precipitation information stored in memory 118 may include a priori information on one or more frequency ranges and associated amplitude levels which is indicative of precipitation. Thus by a comparison of the frequency domain waveform to the reference precipitation information stored in memory 118 occurrence of precipitation in the outdoor environment of the luminaire 100 can be detected by the precipitation detection module 116.

Figure 2B:
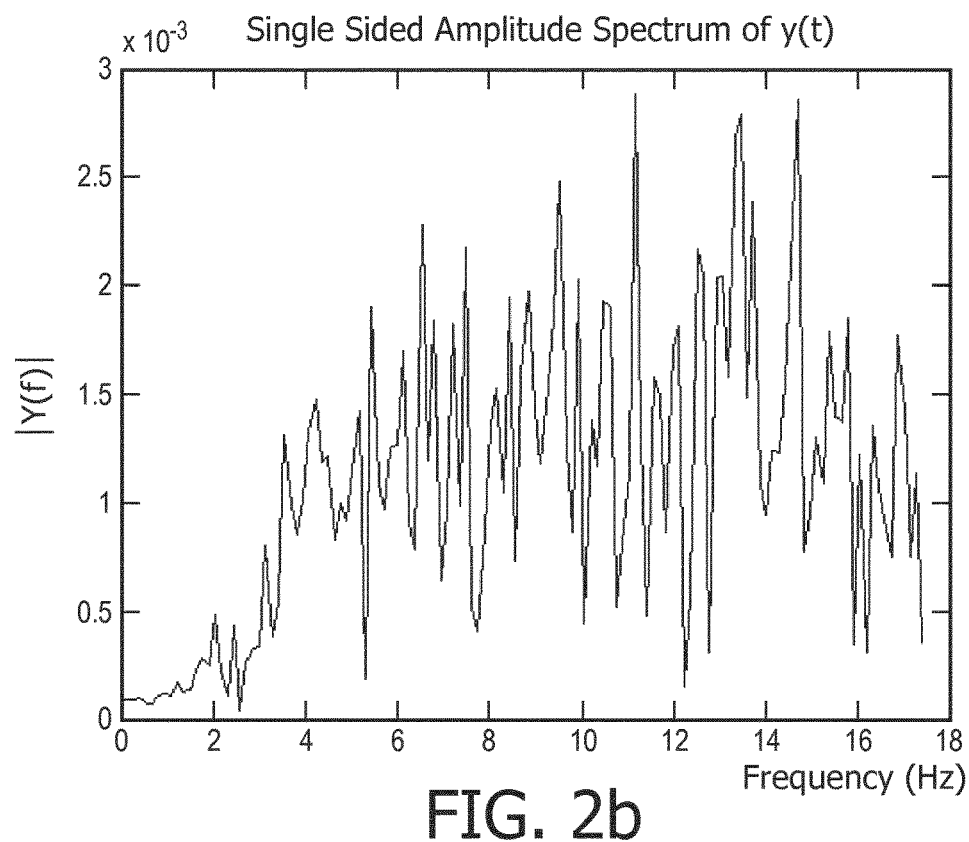
FIG. 2b illustrates a frequency domain representation of the single axis time-domain waveform output by the accelerometer during a time interval of no rain.
Figure 2C:
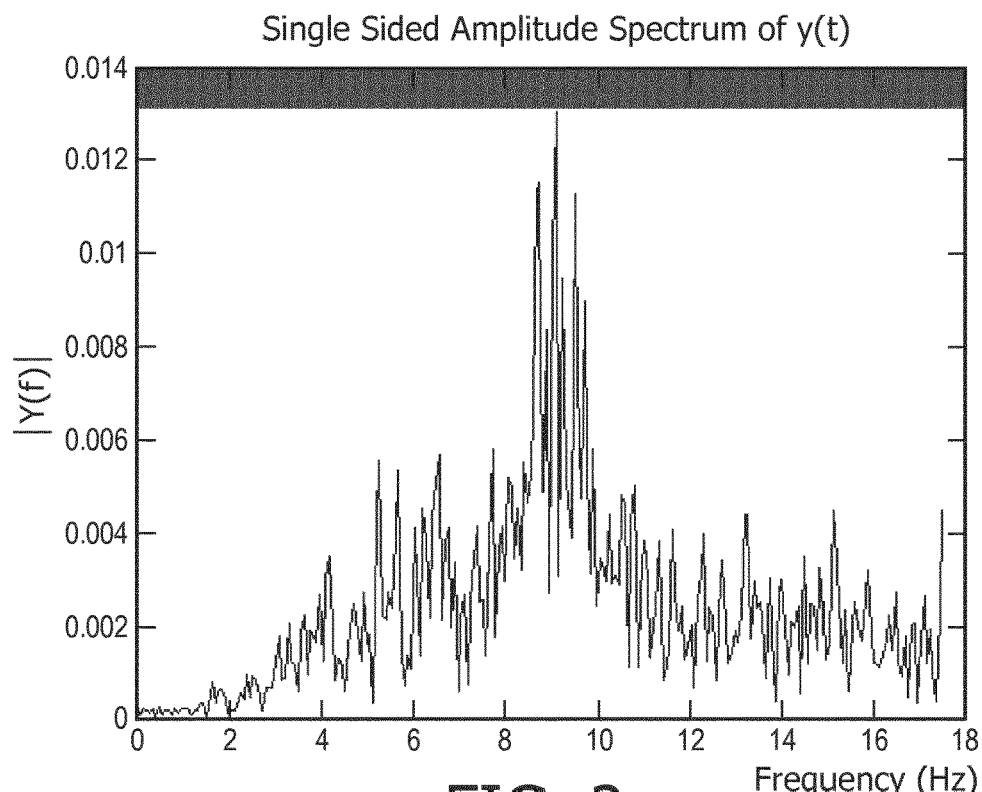
FIG. 2c illustrates a frequency domain representation of the single axis time-domain waveform output by the accelerometer during a time interval of rain.

FIG. 2b illustrates a frequency domain representation of the single axis time-domain waveform (shown in FIG. 2a) output by the accelerometer 108 during a time interval of no rain, and FIG. 2c illustrates a frequency domain representation of the single axis time-domain waveform (shown in FIG. 2a) output by the accelerometer 108 during a time interval of rain.

It can be seen that from a change in signal amplitude during a frequency range (e.g. 8-10 Hz) the occurrence of precipitation in the outdoor environment of the luminaire 100 can be detected by the precipitation detection module 116. The occurrence of precipitation in the outdoor environment may be detected using one of several data processing techniques, for example if the signal amplitude exceeds a predetermined threshold or if the average signal amplitude over a frequency range exceeds a predetermined threshold.

In embodiments of the present disclosure, the precipitation detection module 116 is configured to control the light emitted from the light source(s) 114 based on detecting the occurrence of precipitation in the outdoor environment of the luminaire 100. For example, the precipitation detection module 116 upon detecting the occurrence of precipitation may be configured to increase the light intensity of the light emitted from the light source(s) 114, and/or adapt a characteristic (e.g. hue, saturation, and/or brightness) of the light emitted from the light source(s) 114.

It will be appreciated that precipitation can take the form of one of a plurality of precipitation types e.g. rain, snow, hail, sleet etc. The memory 118 may store reference precipitation information associated with each of a plurality of precipitation types. For example, the memory 118 may store a priori information on one or more frequency ranges and associated amplitude levels that are associated with each of the plurality of precipitation types. Thus by a comparison of the frequency domain waveform to the reference precipitation information stored in memory 118 the detected precipitation can be classified as one of the plurality of precipitation types by the precipitation detection module 116.

The detected precipitation type can be used as an additional input used by the precipitation detection module 116 in the decision process of how to control the light emitted from the light source(s) 114. That is, the precipitation detection module 116 is configured to control the light intensity of the light emitted from the light source(s) 114, and/or a characteristic (e.g. hue, saturation, and/or brightness) of the light emitted from the light source(s) 114 in dependence on the detected precipitation type.

It will be appreciated that precipitation can fall from the sky with varying intensity. The memory 118 may store reference precipitation information associated with each of a plurality of predefined precipitation intensities (e.g. light, moderate, heavy, very heavy etc.). For example, the memory 118 may store a priori information on one or more frequency ranges and associated amplitude levels that are associated with each of the plurality of predefined precipitation intensities. Thus by a comparison of the frequency domain waveform to the reference precipitation information stored in memory 118 the detected precipitation can be classified as one of the plurality of predefined precipitation intensities by the precipitation detection module 116.

The detected precipitation intensity can be used as an additional input used by the precipitation detection module 116 in the decision process of how to control the light emitted from the light source(s) 114. That is, the precipitation detection module 116 is configured to control the light intensity of the light emitted from the light source(s) 114, and/or a characteristic (e.g. hue, saturation, and/or brightness) of the light emitted from the light source(s) 114 in dependence on the detected precipitation intensity. For example, the precipitation detection module 116 may be configured to control the light emitted from the light source(s) 114 in dependence on the detected precipitation intensity e.g. to have a higher light intensity during "heavy" rain than in "light" rain.

Figure 3:
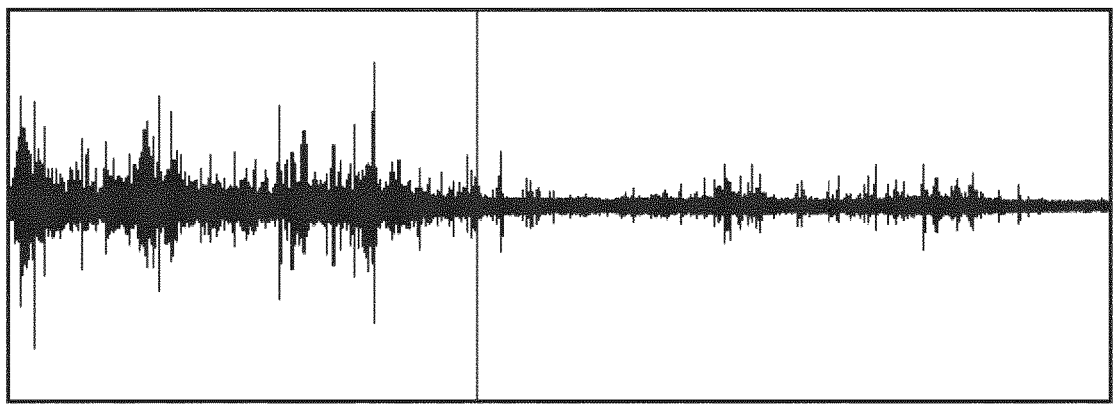
FIG. 3 illustrates a time-domain audio signal output from a microphone during heavy rain fading towards light drizzle.

Reference is now made to FIG. 3 which illustrates a time-domain audio signal output from the microphone 106 during heavy rain fading towards light drizzle.

As can be seen from FIG. 3 the amplitude of the time domain waveform output by the microphone 106 is proportional to the amount of precipitation (e.g. increases during periods of rain) in the outdoor environment of the luminaire 100. Thus it can be seen that the precipitation detection module 116 can use the microphone output signal to detect precipitation and the type/intensity of the precipitation based on analysing the audio waveforms of the scene external to the luminaire 100 in the same manner as described above with respect to the accelerometer output signal.

Whilst the precipitation detection module 116 may use the output of the microphone 106 or the output of the accelerometer 108 to provide the above described precipitation sensing. By using a sensor fusion approach combining the above described sensor modalities, overall detection and classification performance of the precipitation detection module 116 may be increased.

To improve the overall detection and classification performance of the precipitation detection module 116, in addition to using the accelerometer output signal and/or the microphone output signal, the precipitation detection module 116 may use the humidity signal output by the humidity sensor 110 and/or the temperature signal output by the temperature sensor 112 to solve ambiguities arising in the detection/classification process.

The humidity signal/temperature signal may assist with the detection of the occurrence of precipitation in the outdoor environment of the luminaire 100 performed by the precipitation detection module 116. For example, a fall in temperature during a time interval (which often occurs during periods of precipitation) can assist the precipitation detection module 116 to make a positive detection of the occurrence of precipitation when processing of the accelerometer output signal and/or the microphone output signal resulted in inconclusive precipitation detection. Furthermore, the relative humidity is typically between 60% and 100% when it is raining, thus the humidity signal output by the humidity sensor 110 can assist the precipitation detection module 116 to make a positive detection of the occurrence of precipitation when processing of the accelerometer output signal and/or the microphone output signal resulted in inconclusive precipitation detection. During rain the humidity in the outdoor environment of the luminaire 100 is likely to increase as the air is cooled by the falling rain and the rain water is warmed by the surrounding air, increasing evaporation until equilibrium (steady-state) is reached or conditions change. A similar effect will happen when the rain stops.

Furthermore, the humidity signal/temperature signal may assist with the classification of precipitation type of detected precipitation in the outdoor environment of the luminaire 100 performed by the precipitation detection module 116. That is, the precipitation detection module 116 can use one or more predetermined temperature thresholds and the temperature reading from the temperature sensor 112 to solve the ambiguity between two or more precipitation types that may arise from processing only the accelerometer output signal and/or the microphone output signal. For example, the precipitation detection module 116 may classify detected precipitation as hail instead of heavy rain if the temperature signal is indicative of temperature in the outdoor environment of the luminaire 100 of less than 0° C.

A more detailed description of the detection and classification of precipitation in the outdoor environment of the luminaire 100 performed by the precipitation detection module 116 using the humidity signal/temperature signal is provided below.

Whilst embodiments have been described above, with reference to the humidity sensor 110 and/or the temperature sensor 112 being used in combination with the microphone 106 and/or accelerometer 108. Embodiments of the present disclosure extend to scenarios where neither the microphone 106 nor accelerometer 108 are present in the luminaire 100.

The precipitation detection module 116 may be configured to detect the occurrence of precipitation in the outdoor environment of the luminaire 100 based on processing the temperature signal output by the temperature sensor 112. The precipitation detection module 116 may be configured to compare the temperature signal to reference precipitation information stored in memory 118 to detect the occurrence of precipitation in the outdoor environment of the luminaire 100. The reference precipitation information stored in memory 118 may include a priori information on temperature gradients which is indicative of precipitation. Thus by a comparison of the temperature gradients of the temperature signal to the reference precipitation information stored in memory 118 occurrence of precipitation in the outdoor environment of the luminaire 100 can be detected by the precipitation detection module 116.

The memory 118 may store reference precipitation information associated with each of a plurality of precipitation types. For example, the memory 118 may store a priori information on one or more temperature ranges that are associated with each of the plurality of precipitation types. Thus by a comparison of the temperature signal to the reference precipitation information stored in memory 118 the detected precipitation can be classified as one of the plurality of precipitation types by the precipitation detection module 116.

Additionally or alternatively, the precipitation detection module 116 may be configured to detect the occurrence of precipitation in the outdoor environment of the luminaire 100 based on processing the humidity signal output by the humidity sensor 110. The precipitation detection module 116 may be configured to compare the humidity signal to reference precipitation information stored in memory 118 to detect the occurrence of precipitation in the outdoor environment of the luminaire 100. The reference precipitation information stored in memory 118 may include one or more humidity level thresholds which are indicative of precipitation. Thus by a comparison of the humidity signal to the reference precipitation information stored in memory 118 occurrence of precipitation in the outdoor environment of the luminaire 100 can be detected by the precipitation detection module 116.

Fog normally occurs at a relative humidity near 100%. This occurs from either added moisture in the air, or falling ambient air temperature. However, fog can form at lower humidity levels, and fog can sometimes fail to form with relative humidity at 100%. A reading of 100% relative humidity means that the air can hold no additional moisture, the air will become supersaturated if additional moisture is added. The precipitation detection module 116 may perform precipitation detection based on the detection of fog in the outdoor environment of the luminaire 100. Fog forms when the difference between air temperature and dew point is generally less than a predetermined temperature e.g. 2.5° C. A well-known approximation used to calculate the dew point, Tdp, given just the actual ("dry bulb") air temperature, T and relative humidity (in percent), RH, is the Magnus formula. Thus precipitation detection module 116 may be configured to calculate the difference between air temperature and dew point, and compare the result to the predetermined temperature to detect fog in the outdoor environment of the luminaire 100.

The memory 118 may store reference precipitation information associated with each of a plurality of precipitation types. For example, the memory 118 may store a priori information on one or more humidity ranges that are associated with each of the plurality of precipitation types. Thus by a comparison of the humidity signal to the reference precipitation information stored in memory 118 the detected precipitation can be classified as one of the plurality of precipitation types by the precipitation detection module 116.

Upon detecting the occurrence of precipitation in the outdoor environment of the luminaire 100 based on processing the humidity signal and/or the temperature signal, the precipitation detection module 116 is configured to control the light intensity of the light emitted from the light source(s) 114, and/or a characteristic (e.g. hue, saturation, and/or brightness) of the light emitted from the light source(s) 114. If the humidity signal and/or the temperature signal are used by the precipitation detection module 116 to determine the precipitation type of the detected precipitation, the detected precipitation type can be used as an additional input used by the precipitation detection module 116 in the decision process of how to control the light emitted from the light source(s) 114.

Embodiments of the present disclosure extend to other sensor modalities than those described above. That is the sensor(s) 104 may comprise a pressure sensor that is configured to provide a pressure signal indicative of atmospheric pressure in the outdoor environment of the luminaire 100 to the control module 102. The pressure sensor may be a barometer or other sensor capable of providing the sensing functionality of a barometer. If the at least one sensor 104 comprises the pressure sensor, the precipitation detection module 116 is configured to receive the pressure signal output by the pressure sensor.

As a general principle, a high-pressure area will have a clear sky, and a low-pressure area will be cloudy and rainy. As hurricanes pass over coastal areas, air pressure can drop significantly. At sea level air pressure is normally around 1013.25 mb. Extremely strong hurricanes are accompanied by air pressure drops of between 30 and 70 mb.

The precipitation detection module 116 may be configured to detect the occurrence of precipitation in the outdoor environment of the luminaire 100 based on processing the pressure signal output by the pressure sensor. The precipitation detection module 116 may be configured to compare the pressure signal to reference precipitation information stored in memory 118 to detect the occurrence of precipitation in the outdoor environment of the luminaire 100. The reference precipitation information stored in memory 118 may include a priori information on pressure gradients which are indicative of precipitation. Thus by a comparison of the pressure gradients of the pressure signal to the reference precipitation information stored in memory 118 occurrence of precipitation in the outdoor environment of the luminaire 100 can be detected by the precipitation detection module 116. Alternatively or additionally, the reference precipitation information stored in memory 118 may include a predetermined pressure threshold (whereby a pressure level below the pressure threshold is indicative of precipitation). Thus by a comparison of pressure signal to the predetermined pressure threshold occurrence of precipitation in the outdoor environment of the luminaire 100 can be detected by the precipitation detection module 116.

In the embodiments described above, the precipitation detection module 116 may be further configured to store precipitation in a data store e.g. memory 118 of the luminaire 100. The precipitation data includes information pertaining to detected precipitation, for example the time periods during a day when precipitation was detected, the type(s) of detected precipitation, and the intensity of detected precipitation etc.). Alternatively or additionally, the precipitation detection module 116 may be further configured to transmit precipitation data via the network interface of the luminaire (referred to above) to a remote computing device (e.g. a remote weather monitoring station).

The functionality of the precipitation detection module 116 referred to above may be implemented in code (software) stored on a memory comprising one or more storage media (e.g. memory 118), and arranged for execution on a processor comprising on or more processing units. The code is configured so as when fetched from the memory and executed on the processor to perform operations in line with embodiments discussed below. Alternatively it is not excluded that some or all of the functionality of the precipitation detection module 116 is implemented in dedicated hardware circuitry, or configurable hardware circuitry like a field-programmable gate array (FPGA).

In the embodiments described above, the light source(s) 114 may comprise any suitable source of light such as e.g. a high/low pressure gas discharge source, a laser diode, an inorganic/organic light emitting diode (LED), an incandescent source, or a halogen source. A light source may be a single light source, or could comprise multiple light sources, e.g. multiple LEDs which may, for example, form an array of light sources collectively operating as a single light source. The light source(s) 114 are controllable in that the light emitted by the light source(s) 114 may be controlled by the control module 301 or the precipitation detection module 116.

Figure 4:
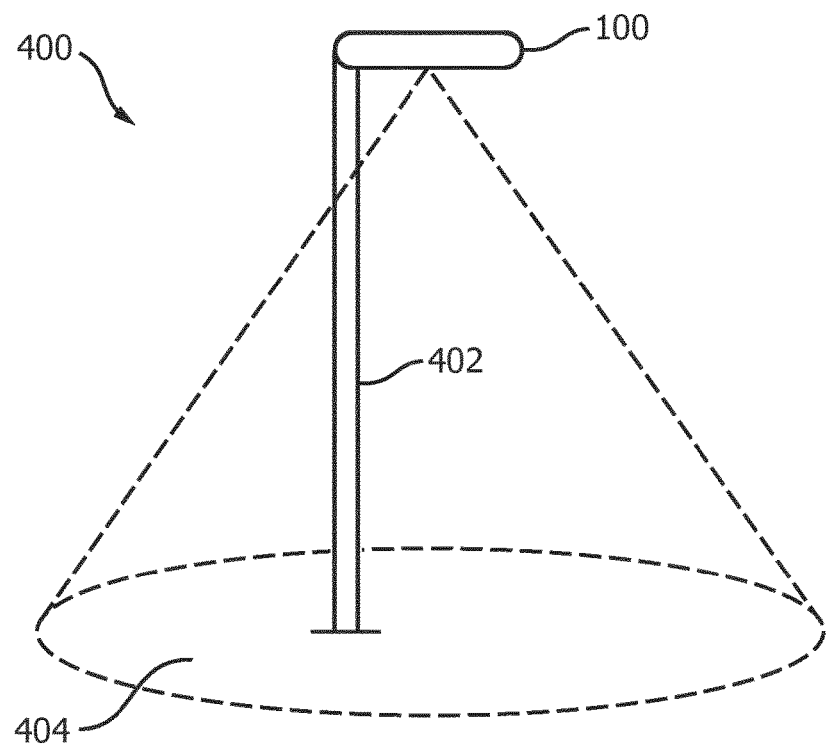
FIG. 4 illustrates an outdoor street light comprising the luminaire.

The luminaire 100 may be embodied in a number of different structures. For example, the luminaire 100 may be a part of a street light that is arranged to provide illumination to a car park, road, highway or other road infrastructure. FIG. 4 illustrates a street light 400 comprising a pole 402 and the luminaire 100, whereby the luminaire 100 is suitably mounted to the pole 402. The pole 402 is a supporting structure that elevates the luminaire 100 to a height off the ground, such that the light source(s) 114 of the luminaire 100 provide illumination in the vicinity of the street light 400. The light footprint 404 of the light source(s) 114 of the luminaire 100 is shown in FIG. 4. The light footprint 404 is not limited to being circular, although it can be.

Whilst embodiments of the present disclosure have been described with reference to a luminaire 100 principles described above can extend to other devices.

A mobile device such as a mobile phone, a tablet, a laptop, a gaming device, a personal digital assistant ("PDA") or other embedded device may comprise one or more of the at least one sensor 104 for purposes well known in the art. A mobile device comprises a control module arranged to receive the sensor output signal from each of the at least one sensor and is configured to communicate with a component of the mobile device based on the at least one sensor output signal. For example, the control module may be configured to transmit audio signals received from a microphone 106 to a transceiver of the mobile device for transmission in a call to another device. The control module may be configured to detect the orientation of the mobile device based on the accelerometer signal output by the accelerometer 108 and control how content should be displayed on a display of the mobile device. The control module may be configured to detect environmental conditions using the humidity signal output by the humidity sensor 110 and/or the temperature signal output by the temperature sensor 112 and control the display of the mobile device to provide information on environmental conditions to the user of the mobile device.

A mobile device comprises output means for presenting information to a user of the mobile device. The output means may be an audio output means, such as one or more speaker, configured to provide audio output signals to the user of the mobile device. The output means may be a visual output means, such as a display or light source, configured to provide visual output signals to the user of the mobile device.

By implementing the precipitation detection module 116 on the mobile device, existing sensors like accelerometers, humidity and temperature sensors, and microphones that are typically provided in a mobile device, can be reused in order to detect precipitation that has been described in more detail above. In this embodiment, the precipitation detection module 116 is configured, in response to detecting precipitation in the environment of the mobile device to control output means of the device to provide an output signal to alert the user of the mobile device that the device may be getting wet. For example the precipitation detection module 116 may be configured to control the audio output means referred to above to provide an audible alert and/or control the visual output means referred to above to provide a visual alert.

In a similar manner, a weather monitoring device comprising one or more of a microphone 106, humidity sensor 110 and a temperature sensor 112 can utilise the above described precipitation detection module 116 in order to improve system performance by providing precipitation detection capabilities.

It will be appreciated the above embodiments have been described only by way of example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A luminaire comprising:
at least one light source arranged to emit light to illuminate an outdoor environment of the luminaire;
at least one sensor, each of the at least one sensor integrated into the luminaire and arranged to provide a respective sensor output signal;
a control module arranged to receive the respective sensor output signal from each of the at least one sensor and configured to communicate with a component of the luminaire based on the respective sensor output signal, wherein the at least one sensor comprises an accelerometer and the respective sensor output signal that is output by the accelerometer is an accelerometer output signal;
a memory storing reference precipitation information, wherein the reference precipitation information comprises a correlation of a plurality of precipitation types with a plurality of frequencies from accelerometer detection signals; and
a precipitation detection module configured to receive the respective sensor output signal from each of the at least one sensor,
wherein the precipitation detection module is configured to convert the accelerometer output signal into a frequency domain waveform and compare the frequency domain waveform to the reference precipitation information,
wherein the precipitation detection module is configured to detect precipitation in the outdoor environment based on said comparison,
wherein the precipitation detection module is configured to control the light emitted from the at least one light source based on said detection.

2. A luminaire according to claim 1, wherein the memory stores reference precipitation information associated with each of a plurality of precipitation types; wherein the precipitation detection module is configured to:
compare the frequency domain waveform to the reference precipitation information to classify the detected precipitation as one of the plurality of precipitation types; and
control the light emitted from the at least one light source based on the precipitation type as which the detected precipitation is classified.

3. A luminaire according to claim 1, wherein the memory stores precipitation information associated with each of a plurality of precipitation intensities; wherein the precipitation detection module is configured to:
compare the frequency domain waveform to the reference precipitation information to classify the detected precipitation as one of the plurality of precipitation intensities; and
control the light emitted from the at least one light source based on the precipitation intensity as which the detected precipitation is classified.

4. A luminaire according to claim 1, wherein the at least one sensor comprises a microphone configured to provide a microphone output signal.

5. A luminaire according to claim 3, wherein the at least one sensor comprises at least one of:
a temperature sensor configured to provide a temperature signal indicative of a temperature of the outdoor environment of the luminaire, wherein the precipitation detection module is configured to classify the detected precipitation as one of a plurality of precipitation types based on the temperature signal; and
a humidity sensor configured to provide a humidity signal indicative of a humidity level of the outdoor environment of the luminaire, wherein the precipitation detection module is configured to classify the detected precipitation as one of the plurality of precipitation types based on the humidity signal.

6. A luminaire according to claim 1, wherein the reference precipitation information comprises a plurality of frequency ranges and associated amplitude levels associated with said plurality of precipitation types.

7. A luminaire according to claim 1, wherein the at least one sensor comprises a temperature sensor arranged to provide a temperature signal indicative of a temperature of the outdoor environment of the luminaire, and the precipitation detection module is configured to detect occurrence of precipitation in the outdoor environment based on the temperature signal.

8. A luminaire according to claim 7, wherein the precipitation detection module is further configured to classify the detected precipitation as one of a plurality of precipitation types based on the temperature signal.

9. A luminaire according to claim 1, wherein the at least one sensor comprises a humidity sensor configured to provide a humidity signal indicative of a humidity level of the outdoor environment of the luminaire, and the precipitation detection module is configured to detect occurrence of precipitation in the outdoor environment based on the humidity signal.

10. A luminaire according to claim 9, wherein the precipitation detection module is further configured to classify the detected precipitation as one of a plurality of precipitation types based on the humidity signal.

11. A luminaire according to claim 1, wherein the at least one sensor comprises a pressure sensor configured to provide a pressure signal indicative of atmospheric pressure in the outdoor environment of the luminaire, and the precipitation detection module is configured to detect occurrence of precipitation in the outdoor environment based on the pressure signal.

12. A luminaire according to claim 1, further comprising a network interface, wherein the precipitation detection module is further configured to collect precipitation data based on the respective sensor output signal from each of the at least one sensor and transmit the collected precipitation data to a remote computing device via the network interface.

13. The luminaire according to claim 1, wherein the accelerometer is an orientation sensor and the accelerometer output signal is an orientation sensor output signal.

14. The luminaire according to claim 13, wherein the control module is configured to determine an orientation of a luminaire component based on an output of the orientation sensor.

15. A street light comprising:
a pole; and
the luminaire according to claim 1, wherein the luminaire is mounted to said pole.

16. A mobile device comprising:
an output;
at least one sensor, each of the at least one sensor integrated into the mobile device and arranged to provide a respective sensor output signal;
a control module arranged to receive the respective sensor output signal from each of the at least one sensor and configured to communicate with a component of the mobile device based on the respective sensor output signal, wherein the at least one sensor comprises an accelerometer and the respective sensor output signal that is output by the accelerometer is an accelerometer output signal;
a memory storing reference precipitation information, wherein the reference precipitation information comprises a correlation of a plurality of precipitation types with a plurality of frequencies from accelerometer detection signals; and
a precipitation detection module configured to receive the respective sensor output signal from the each of the at least one sensor,
wherein the precipitation detection module is configured to convert the accelerometer output signal into a frequency domain waveform and compare the frequency domain waveform to the reference precipitation information,
wherein the precipitation detection module is configured to detect precipitation in the outdoor environment based on said comparison,
wherein the precipitation detection module is configured to control the output to provide an output signal based on said detection.

17. The mobile device according to claim 16, wherein the reference precipitation information comprises a plurality of frequency ranges and associated amplitude levels associated with the plurality of precipitation types.

18. The mobile device according to claim 16, wherein the accelerometer is an orientation sensor and the accelerometer output signal is an orientation sensor output signal.

19. The mobile device according to claim 18, wherein the control module is configured to determine an orientation of the mobile device based on an output of the orientation sensor.

* * * * *